United States Patent [19]

Asayama

[11] Patent Number: 5,187,537
[45] Date of Patent: Feb. 16, 1993

[54] VEHICLE FOLLOWING APPARATUS

[75] Inventor: Yoshiaki Asayama, Himeji, Japan

[73] Assignee: Mitsubishi Denki Kabushiki Kaisha, Tokyo, Japan

[21] Appl. No.: 795,070

[22] Filed: Nov. 20, 1991

[30] Foreign Application Priority Data

Nov. 22, 1990 [JP] Japan .................................. 2-318919

[51] Int. Cl.$^5$ .............................................. G01C 3/00
[52] U.S. Cl. ...................................... 356/1; 358/105; 358/126
[58] Field of Search ...................... 358/105, 126; 356/1

[56] References Cited

U.S. PATENT DOCUMENTS 4,931,937  6/1990  Kakinami et al. .
5,023,712  6/1991  Kajiwara .

FOREIGN PATENT DOCUMENTS 4006989  3/1990  Fed. Rep. of Germany .
116386  12/1981  Japan .
22975   2/1983  Japan .
196412  11/1983  Japan .
120273   6/1985  Japan .
2202104  2/1988  United Kingdom .

*Primary Examiner*—Mark Hellner
*Attorney, Agent, or Firm*—Sughrue, Mion, Zinn, Macpeak and Seas

[57] ABSTRACT

A vehicle following apparatus is able to continuously or successively measure, once a target vehicle to be followed is determined, the distance to the target vehicle in a stable and reliable manner even if the subject vehicle, on which the apparatus is mounted, is momentarily caused to move in the vertical or horizontal direction with respect to the target vehicle. A pair of first and second image sensors including a pair of optical systems are disposed at a predetermined distance from each other for optically sensing a plurality of objects including a preceding vehicle running ahead of the subject vehicle. A first window containing therein an image of the preceding vehicle as sensed by the image sensors is defined on a screen of a display. A second window is also defined on the screen adjacent the first window for catching the background of the preceding vehicle. The position of the first window is controlled to automatically follow the image of the preceding vehicle by measuring the distances to the objects in the respective first and second windows.

6 Claims, 5 Drawing Sheets

IMAGES IN MEMORY 9

IMAGES IN MEMORY 8

VEHICLE FOLLOWING APPARATUS

BACKGROUND OF THE INVENTION

The present invention relates to a vehicle following apparatus which enables a vehicle to automatically follow a preceding vehicle running ahead thereof while optically measuring the distance thereto.

Examples of an optical distance detecting apparatus utilizing image sensors are known from Japanese Patent Publication Nos. 63-38085 and 63-46363. As illustrated in FIG. 7, the apparatuses disclosed therein commonly have a pair of first and second parallel optical systems having two convex lenses 101, 102 disposed in a horizontally aligned relation at a prescribed distance L away from each other. A pair of separate image sensors 103, 104 are horizontally disposed at focal points of the lenses 101, 102 at a distance f from the locations of corresponding lenses 101, 102, respectively, for generating respective image signals to a common signal processor 120. The signal processor 120 successively shifts the image signals from the image sensors 103, 104 and electrically superposes them one over the other, so that the distance R from the lenses 101, 102 to an object 121 is calculated based on the principle of triangulation using the following formula:

$$R = (f \times L)/d$$

where d is a shift distance by which the image signals are moved to obtain the best match.

On the other hand, a typical method of following a preceding vehicle using image sensors or the like is disclosed in Japanese Patent Publication No. 60-33352. In this method, for the purpose of following a target on a display screen, an operator has to set a following gate or window on the display screen which encloses the target to be followed, while looking at the screen.

With the distance detecting apparatus as described above, the distance to an object is measured on the basis of a comparison between a pair of images sensed by the pair of optical systems including the image sensors. Accordingly, in cases where this apparatus is mounted on a vehicle for measuring the distance to a preceding vehicle, it is difficult for the driver to precisely determine to which vehicle the distance measurement is being effected if there are a plurality of preceding vehicles.

In addition, let us consider the case in which the above-described vehicle following method is used in combination with the above-described distance detecting apparatus for the purpose of following a preceding vehicle. In this case, if a vehicle provided with the distance detecting apparatus runs on a bad road having relatively large surface irregularities and bounces, a window defined on a display screen for following the preceding vehicle is forced to displace in the vertical direction, so that it loses sight of the preceding vehicle and becomes unable to perform a stable and reliable vehicle-following operation. Likewise, if the vehicle is travelling on a curved road, the vehicle following window is caused to displace sidewise to the right or left, thus resulting in the same situation as described above.

SUMMARY OF THE INVENTION

Accordingly, the present invention is intended to overcome the above-mentioned problems encountered with the above-mentioned prior art.

An object of the invention is to provide a novel and improved vehicle following apparatus which is able to continuously or successively measure, once a target vehicle to be followed is determined, the distance to the target vehicle in a stable and reliable manner even if the subject vehicle, on which the apparatus is mounted, is momentarily caused to move in the vertical or horizontal direction with respect to the target vehicle.

Another object of the invention is to provide a novel and improved vehicle following apparatus in which the driver can readily see to which vehicle the distance is being measured even if there are a plurality of preceding vehicles.

In order to achieve the above objects, according to the present invention, there is provided a vehicle following apparatus with a distance measuring function, the apparatus comprising: a pair of first and second image sensors including a pair of optical systems disposed at a predetermined distance from each other for optically sensing a plurality of objects including a preceding vehicle running ahead of a subject vehicle, on which the vehicle following apparatus is mounted; a first memory for storing the images of the objects sensed by the first image sensor as first image signals; a second memory for storing the images of the objects sensed by the second image sensor as second image signals; a display with a screen for displaying the images of the objects as sensed by the image sensors on the screen; image following means for defining on the screen of the display a first window containing therein an image of a preceding vehicle running ahead of the subject vehicle, and a second window adjacent the first widow for catching the background of the preceding vehicle, the image following means being operable to control the first window in such a manner as to automatically follow the image of the preceding vehicle; distance calculating means for calculating the distances to the objects in the respective first and second windows based on deviations of the images of the objects, which are sensed by the second image sensor and stored in the second memory, from corresponding reference images of the objects within the first window, which are sensed by the first image sensor and stored in the first memory; and window position correcting means for correcting the position of the first window on the basis of the information on the distances calculated by the distance calculating means so that the first window can catch and follow the image of the preceding vehicle without fail.

In a preferred form of the invention, the image following means defines the second window at a location adjacent and above the first window, and the window position correcting means moves the position of the first window in a vertical direction depending upon whether the distance to the object in the first window is equal to or greater than the distance to the object in the second window.

The window position correcting means moves the position of the first window in an upward direction if the distance to the object in the first window is equal to the distance to the object in the second window, or in a downward direction if the distance to the object in the first window is greater than the distance to the object in the second window.

In another preferred form of the invention, the image following means defines the second window at a location horizontally adjacent one side of the first window, and the window position correcting means moves the position of the first window in a horizontal direction depending upon whether the distance to the object in the first window is equal to or greater than the distance to the object in the second window.

The window position correcting means moves the position of the first window in a horizontal direction toward the second window if the distance to the object in the first window is equal to the distance to the object in the second window, or in a direction away from the second window if the distance to the object in the first window is greater than the distance to the object in the second window.

The above and other objects, features and advantages of the invention will become more readily apparent from the detailed description of a few preferred embodiments of the invention taken in conjunction with the accompanying drawings.

BRIEF DESCRIPTION OF THE DRAWINGS

In the figures, the same or corresponding parts are identified by the same symbols.

DESCRIPTION OF THE PREFERRED EMBODIMENT

A preferred embodiment of the present invention will now be described in detail with reference to the accompanying drawings.

Figure 1:
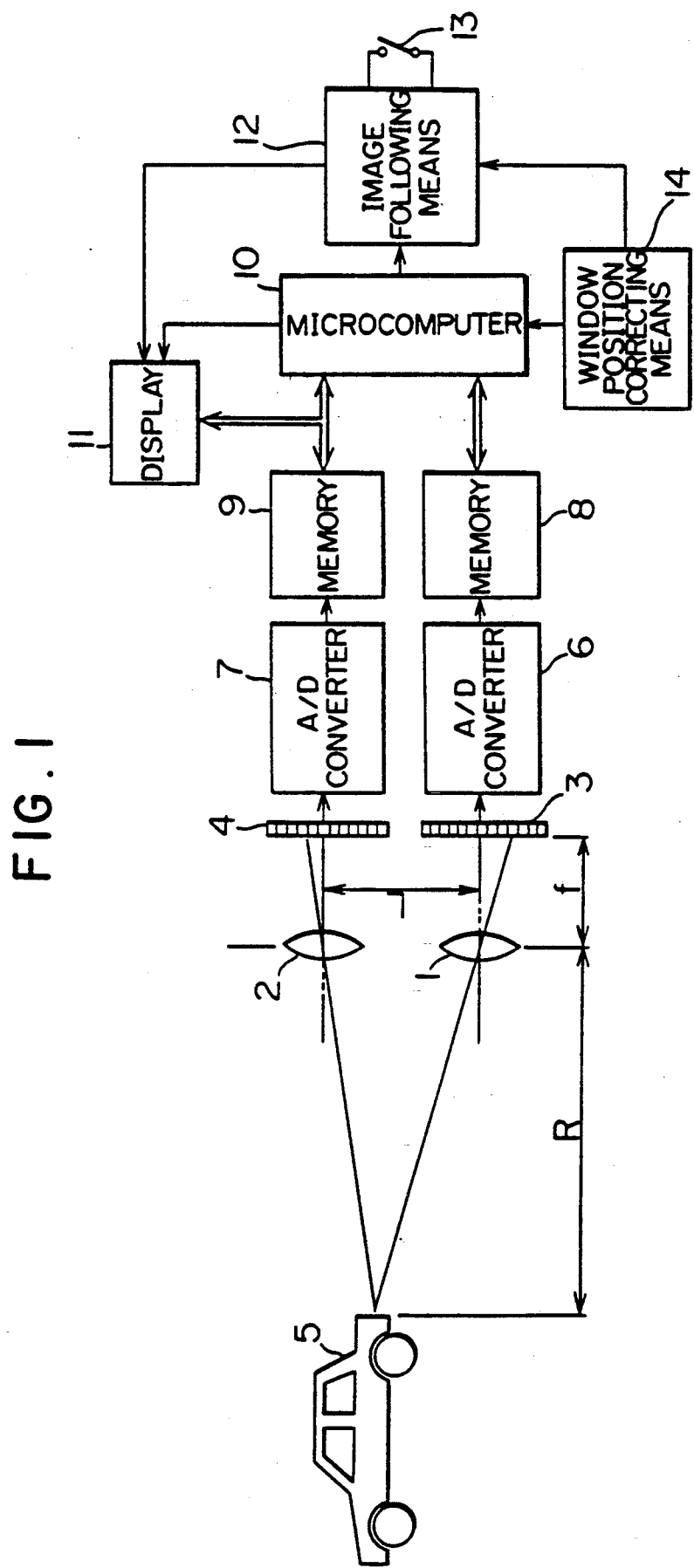
FIG. 1 is a schematic block diagram showing the general arrangement of a vehicle following apparatus in accordance with the present invention.

FIG. 1 illustrates, in a block diagram, the schematic arrangement of a vehicle following apparatus which is constructed in accordance with the principles of the invention and which is mounted on a vehicle for the purpose of following a preceding vehicle while measuring the distance thereto.

The apparatus illustrated includes a pair of first and second parallel optical systems having two convex lenses 1, 2 disposed in a vertically aligned relation at a prescribed distance L away from each other, and a pair of separate first and second (e.g., upper and lower) image sensors 3, 4 which are vertically or otherwise disposed at focal points of the lenses 1, 2, respectively, at a distance f from the locations of the corresponding lenses 1, 2 for generating first and second image signals in the form of analog signals representative of a two-dimensional image, which are input to a pair of corresponding first and second analog-to-digital (A/D) converters 6, 7. The outputs of the A/D converters 6, 7 are input to a pair of corresponding first and second memories 8, 9 and stored therein. A microcomputer 10, which acts as a distance calculating means and an obstacle discriminating means, performs data transfer with the memories 8, 9 so that it makes various calculations and determinations based on the data stored in the memories 8, 9. A display 11 having a screen is connected to the first and second memories 8, 9 and the microcomputer 10 for displaying the images of objects sensed by the first or second image sensor 8, 9 on the screen. The operation of the display 11 is controlled by the microcomputer 10. An image following means 12 is connected to the microcomputer 10 for following the image 5a of a preceding vehicle 5 and defining on the screen of the display 11 a first window 15 for use in following the image 5a of the preceding vehicle 5, as well as a second window 16 in the vicinity of or adjacent the first window 15, which is used for proper adjustment in the position of the first window 15 relative to the preceding vehicle image 5a. An instruction switch 13 is connected to the image following means 12 so that it is operated by the driver to instruct the image following means 12 to start following a preceding vehicle. A window position correcting means 14 is connected to the microcomputer 10 and the image following means 12 so that on the basis of information about the distance to objects caught by the first and second windows 15, 16, it serves to properly correct the position of the first window 15 as set by the image following means 12.

Figure 2:
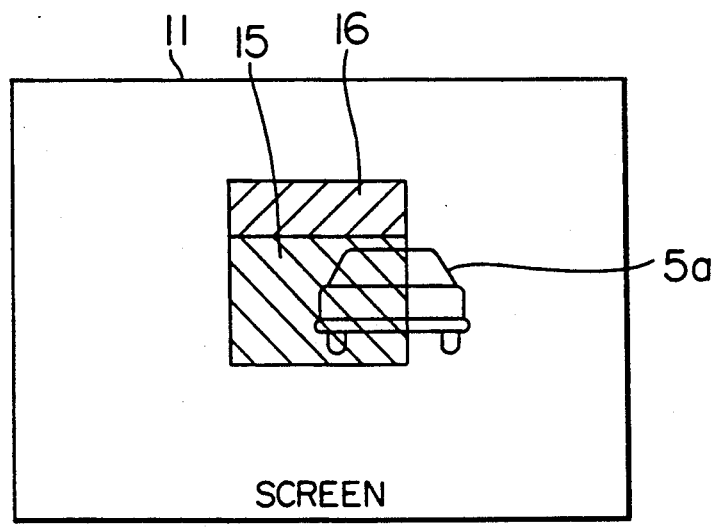
FIG. 2 is an explanatory view showing that a preceding vehicle comes in a display screen of the apparatus of FIG. 1.

The operation of the above embodiment will be described below while referring to FIGS. 2 and 3. First, let us assume that an object in the form of a preceding vehicle 5 lying ahead of the subject vehicle is sensed by the second or upper image sensor 4, digitized by the second A/D converter 7, stored in the second memory 9, and then displayed as an image 5a on the screen of the display 11, as shown in FIG. 2, on which a first window 15 and a second window 16 are defined by the image following means 12. In this case, the driver steers his or her vehicle to move it relative to the preceding vehicle 5 so that the image 5a of the preceding vehicle 5 displayed on the screen 11 comes inside the first window 15.

Figure 3:
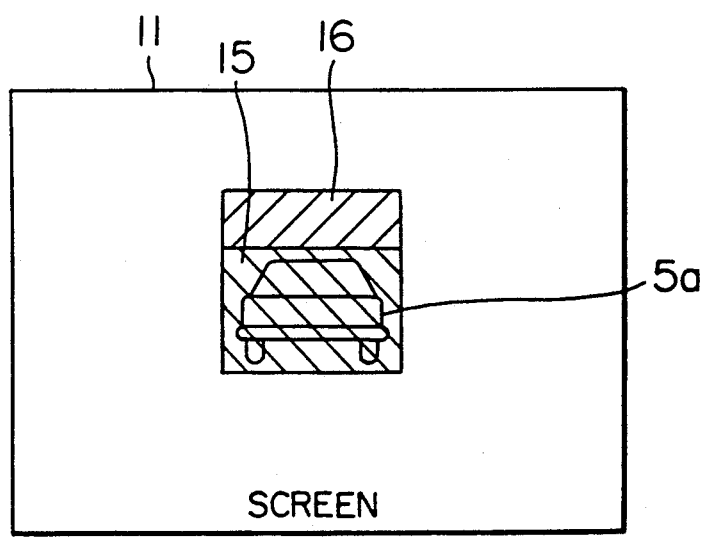
FIG. 3 is an explanatory view showing that the preceding vehicle has fully come in or been enclosed by a first vehicle-following window defined in the display screen.

Subsequently, when the preceding vehicle image 5a has fully come inside or been enclosed by the first window 15, as shown in FIG. 3, the driver operates to turn the instruction switch 13 on whereby the vehicle of the driver is controlled to automatically follow the preceding vehicle 5 while catching the image 5a thereof in the first window 15 without fail irrespective of any movement thereof. In this regard, the second window 16, which is defined, in the illustrated embodiment, on the screen 11 just above the first window 15 in vertical alignment therewith, also automatically accompanies the movement of the first window 15.

Here, it is to be noted that the above-described vehicle-following operation of the apparatus is already known and substantially similar to what is performed by the conventional vehicle following method as disclosed in the aforementioned Japanese Patent Publication No. 60-33352 or Japanese Patent Publication No. 1-35305. Therefore, a further detailed description thereof is omitted.

Figure 5:
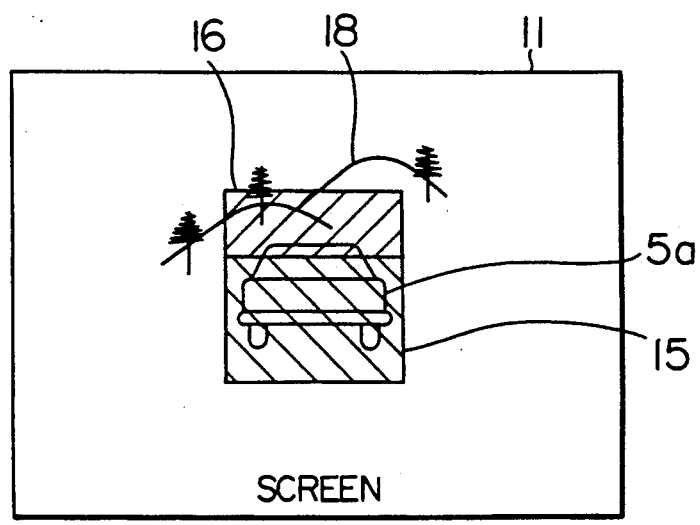
FIG. 5 is an explanatory view showing a state in which the first window is displaced in a downward direction relative to the image of the preceding vehicle on the display screen.
Figure 6:
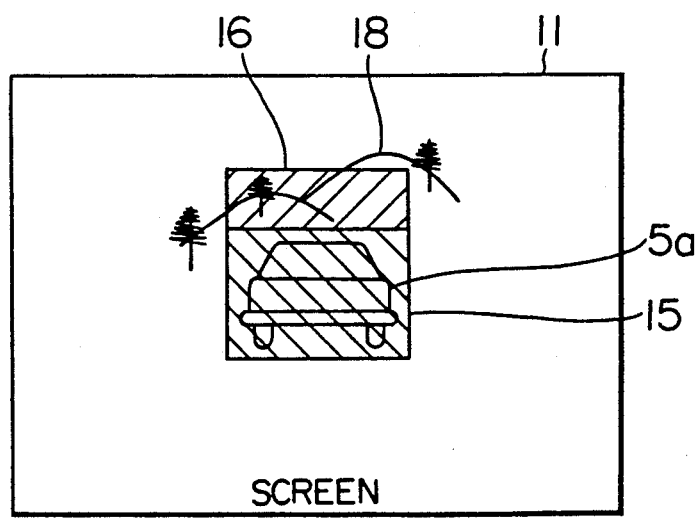
FIG. 6 is an explanatory view showing a state in which the first window is displaced in an upward direction relative to the image of the preceding vehicle on the display screen.
Figure 7:
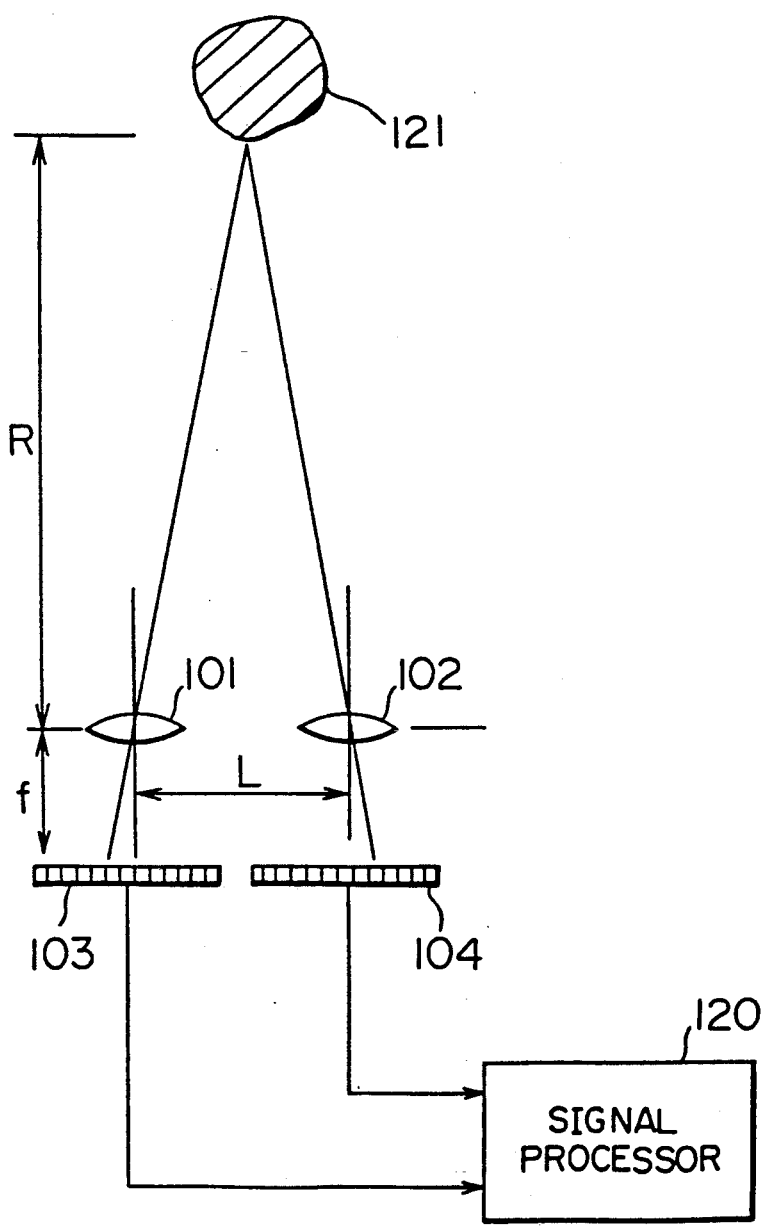
FIG. 7 is a block diagram showing the general arrangement of a conventional distance measuring apparatus for a vehicle.

Next, description will be made of how to measure the distance to the preceding vehicle 5 with particular reference to FIGS. 4(a) and 4(b) as well as FIGS. 5 and 6. First, the microcomputer 10 reads out from the second memory 9 image signals or picture element (pixel) signals within the first window 15 following the image 5a of the preceding vehicle 5, and makes them as reference image or pixel signals. Then, the microcomputer 10 selects, from the first memory 8 storing therein pixel signals sensed by the first or lower image sensor 3, an area corresponding vertically to the first window 15, and calculates a sum of the absolute values of differences or deviations between the pixel signals thus selected from the first memory 8 and the corresponding reference pixel signals by successively shifting the pixel signals in the first memory 8 one pixel by one pixel.

That is, the position of an image stored in the first memory 8, which provides the best match with the reference image 5a in the first window 15, is determined by successively shifting the pixel signals selected from the first memory 8 one pixel by one pixel.

Figure 4A:
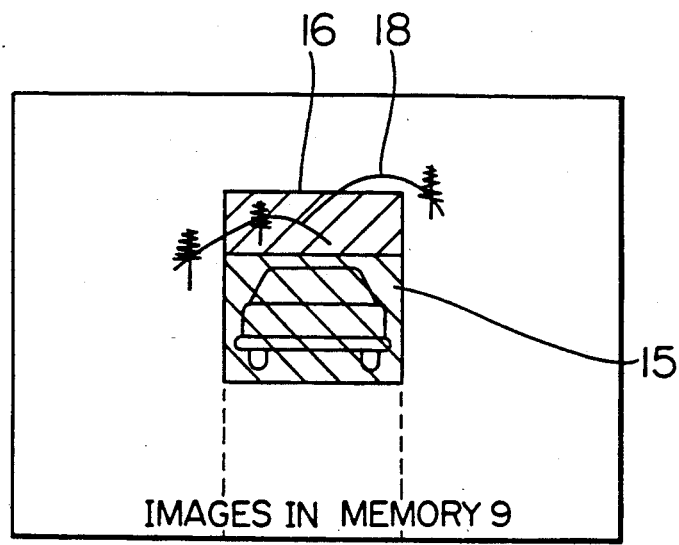
FIG. 4(a) is an explanatory view showing the first window catching the image of the preceding vehicle stored in a second memory.
Figure 4B:
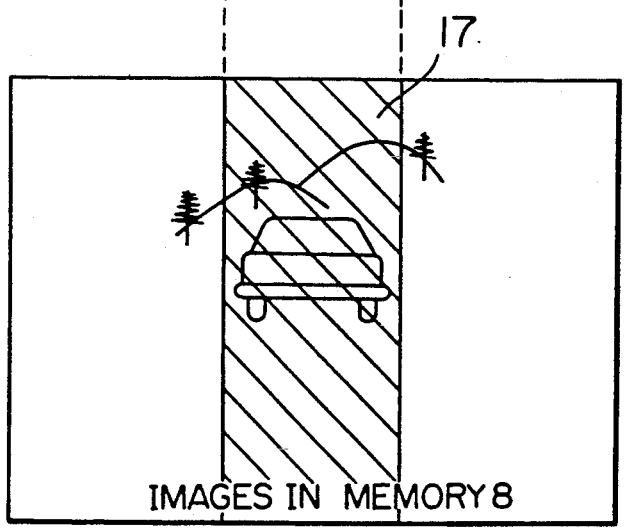
FIG. 4(b) is an explanatory view showing an image area in a first memory to be compared with or searched for the image in the first window.

In this case, as shown in FIGS. 4(a) and 4(b), the area in the first memory 8 relating to or to be searched for the above calculation is a vertical band area 17 which corresponds vertically to or is in vertical alignment with the position of the first window 15 stored in the second memory 9.

On the basis of the above comparison between the corresponding upper and lower pixel signals from the first and second memories 8, 9 as performed in the above manner, the distance R to the preceding vehicle 5 is given by the following formula:

$$R = (f \times L)/(n \times p) \quad (2)$$

where n is a shift amount in the form of the number of pixels which provides a minimum for the sum of the absolute values of the above differences; p is the pitch between adjacent pixels; L is the length of a base line between the optical systems (i.e., the length between the centers of the lenses 1, 2); and f is the focal distance of the lenses 1, 2.

In this manner, once the preceding vehicle 5 to be followed is set by the driver, it becomes possible to continuously or successively measure the distance to the preceding vehicle 5 while following it.

In addition, it is also possible to measure the distance to an object in the same manner, which lies ahead of the subject vehicle in the background of the preceding vehicle 5 and which is caught by the second window 16 set around the first window 15 on the display screen.

Specifically, let us assume that there is a mountain, a hill 18 or the like ahead of the subject vehicle in the background of the preceding vehicle 5, as shown in FIGS. 4(a) and 4(b). In this case, an image 18 of the mountain comes in the second window 16, and the microcomputer 10 reads out image signals or picture element (pixel) signals in the second window 16 from the second memory 9, and makes them as reference image or pixel signals. Then, the microcomputer 10 selects from the first memory 8, which stores therein the image or pixel signals sensed by the first or lower image sensor 3, a vertical band area 17 corresponding vertically to or aligned vertically with the second window 16, and calculates a total sum of the absolute values of differences or deviations between the corresponding upper and lower image or pixel signals in the second and first memories 9, 8 by successively shifting image or pixel signals within the area 17 with respect to the above defined reference image or pixel signals one pixel by one pixel, to provide the position of an image in the area 17 which best matches the image 18 in the second window 16.

Similar to formula (2) above, the distance A to the mountain 18 in the background of the preceding vehicle 5 is given by the following formula:

$$A = (f \times L)/(m \times p) \quad (3)$$

where m is the amount of shift or the number of shifted pixels which provides a minimum for the total sum of the absolute values of the differences or deviations between the corresponding upper and lower pixels in the second and first memories 9, 8.

The information on the inter-vehicle distance R (i.e., the distance to the preceding vehicle 5) caught by the first window 15 as well as the distance A to the object 18 (which is a mountain in the illustrated embodiment) caught by the second window 16 and calculated in the above manner is successively input to the window position correcting means 14 where the inter-vehicle distance R and the distance A to the object 18 are compared with each other.

If the distance A to the object 18 is greater than the inter-vehicle distance R, the microcomputer 10 determines that the image 18 of the object in the second or upper window 16 is not a portion of the image 5a of the preceding vehicle 5, and that the first window 15 may be positioned too high with respect to the preceding vehicle image 5a. Thus, in this case, the window position correcting means 14 operates to displace the position of the first window 15 in a downward direction relative to the preceding vehicle image 5a. As a result, as shown in FIG. 5, a portion of the preceding vehicle image 5a comes in the second window 16, so the distance to the preceding vehicle 5 can be measured by the second window 16.

If the distance A is equal to the inter-vehicle distance R, the microcomputer 10 determines that the image 18 of the object in the second window 16 is a portion of the image 5a of the preceding vehicle 5, and that the first window 15 may be positioned too low with respect to the precedin vehicle image 5a. Accordingly, the window position correcting means 14 begins to displace the position of the first window 15 in an upward direction relative to the preceding vehicle image 5a, so that the image 5a of the preceding vehicle 5 entirely disappears from the second window 16, which then catches a background object 18 such as a mountain more distant from the subject vehicle than the preceding vehicle 5 in order to measure the distance A to the mountain 18. As a consequence, the distance A becomes greater than the inter-vehicle distance R.

In the above manner, the first window 15 following the preceding vehicle image 5a is vertically moved in an automatic fashion so that the position of the first window 15 is prevented from any excessive vertical displacements with respect to the preceding vehicle image 5a, thus enabling the first window 15 to follow it in a most stable and reliable manner.

Although in the above description, the second window 16 is set at a location adjacent and above the first window 15 so as to prevent excessive vertical displacements thereof with respect to the preceding vehicle image 5a, it can be defined at any other location around the first window 15. For example, it can be set to the right or left of the first window 15 (or horizontally adjacent one side thereof) for the purpose of preventing any excessive lateral or sidewise displacement of the first window 15 relative to the preceding vehicle image 5a.

In addition, the size and/or configuration of the first and second windows 15, 16 are not limited to those as described above but can arbitrarily be varied in accordance with an object to be followed or caught.

What is claimed is:

1. A vehicle following apparatus with a distance measuring function, said apparatus comprising:
   a pair of first and second image sensors including a pair of optical systems disposed at a predetermined distance from each other for optically sensing a plurality of objects including a preceding vehicle running ahead of a subject vehicle, on which said vehicle following apparatus is mounted;
   a first memory for storing the images of said objects sensed by said first image sensor as first image signals;
   a second memory for storing the images of said objects sensed by said second image sensor as second image signals;
   a display with a screen for displaying the images of said objects as sensed by said image sensors on the screen;
   image following means for defining on the screen of said display a first window containing therein an image of a preceding vehicle running ahead of the subject vehicle, and a second window adjacent said first window for catching the background of the preceding vehicle, said image following means being operable to control said first window in such a manner as to automatically follow the image of the preceding vehicle;
   distance calculating means for calculating the distances to the objects in said respective first and second windows based on deviations of the images of the objects, which are sensed by said second image sensor and stored in said second memory, from corresponding reference images of the objects within said first window, which are sensed by said first image sensor and stored in said first memory; and
   window position correcting means for correcting the position of said first window on the basis of the information on the distances calculated by said distance calculating means so that said first window can catch and follow the image of the preceding vehicle without fail.

2. A distance detecting apparatus according to claim 1, wherein said image following means defines said second window at a location adjacent and above said first window, and said window position correcting means moves the position of said first window in a vertical direction depending upon whether the distance to the object in said first window is equal to or greater than the distance to the object in said second window.

3. A distance detecting apparatus according to claim 2, wherein said window position correcting means moves the position of said first window in an upward direction if the distance to the object in said first window is equal to the distance to the object in said second window, or in a downward direction if the distance to the object in said first window is greater than the distance to the object in said second window.

4. A distance detecting apparatus according to claim 1, wherein said image following means defines said second window at a location horizontally adjacent one side of said first window, and said window position correcting means moves the position of said first window in a horizontal direction depending upon whether the distance to the object in said first window is equal to or greater than the distance to the object in said second window.

5. A distance detecting apparatus according to claim 4, wherein said window position correcting means moves the position of said first window in a horizontal direction toward said second window if the distance to the object in said first window is equal to the distance to the object in said second window, or in a direction away from said second window if the distance to the object in said first window is greater than the distance to the object in said second window.

6. A distance detecting apparatus according to claim 1, wherein said first and second image sensors are disposed substantially in a vertically spaced relation with respect to each other, and said deviations are vertical deviations of the images of the objects sensed by said second image sensor from the corresponding reference images of the objects within said first window sensed by said first image sensor.

* * * * *